United States Patent [19]

Berman et al.

[11] Patent Number: 4,859,031
[45] Date of Patent: Aug. 22, 1989

[54] OPTICAL COLLIMATING APPARATUS

[75] Inventors: Arthur L. Berman, Milpitas; James E. Melzer, San Jose, both of Calif.

[73] Assignee: Kaiser Electronics, San Jose, Calif.

[21] Appl. No.: 80,739

[22] Filed: Aug. 3, 1987

[51] Int. Cl.[4] .................. G02B 27/14; G02B 5/30; G02F 1/13

[52] U.S. Cl. .................................. 350/174; 350/172; 350/320; 350/352; 350/370

[58] Field of Search ............... 350/174, 169, 320, 352, 350/370, 379, 171, 172

[56] References Cited

U.S. PATENT DOCUMENTS

| Re. 27,356 | 5/1972 | La Russa | 350/157 |
|---|---|---|---|
| 3,848,974 | 11/1974 | Hosking et al. | 350/174 |
| 3,915,548 | 10/1975 | Opittek et al. | 350/3.5 |
| 3,940,203 | 2/1976 | La Russa | 350/3.5 |
| 4,093,347 | 6/1978 | La Russa | 350/174 |
| 4,589,735 | 5/1986 | Saunders | 350/338 |

OTHER PUBLICATIONS

Xerox Disclosure Journal, vol. 1, No. 3, Mar. 1976, pp. 85–86.
Physical Review Letters, Dependence of Pitch on Composition in Cholesteric Liquid Crystals, by Adams et al., vol. 22, Jan. 20, 1969, pp. 92–94.
James Adams et al., "Cholesteric Films as Optical Filters", J. Applied Phys., vol. 42, No. 10, Sep. 1971.

Primary Examiner—John K. Corbin
Assistant Examiner—Ronald M. Kachmarik
Attorney, Agent, or Firm—Townsend and Townsend

[57] ABSTRACT

An optical collimating apparatus employs a semi-reflective concave mirror and cholesteric liquid crystal element. In one embodiment, the optical collimating apparatus is used as a heads-up display device. Images in the line of sight of an observer substantially pass through a transmitter/combiner, semi-reflective concave mirror, and cholesteric liquid crystal element to an observer. Images generated by an image source are focussed on the transmitter/combiner such that the transmitter/combiner reflects the images into the line of sight of the observer. The generated images are transmitted by the primarily transmissive (convex) side of the semi-reflective concave mirror to the cholesteric liquid crystal element. The cholesteric liquid crystal element reflects the generated images back toward the primarily reflective (concave) side of the semi-refective concave mirror, which in turn reflects the images back toward the cholesteric liquid crystal element, which transmits the generated images to the observer. In an alternative embodiment, such as in a flight simulator or similar device, an image source projects images upon the primarily transmissive (convex) side of a semi-reflective concave mirror which transmits the images to a cholesteric liquid crystal element. The images are reflected by the cholesteric liquid crystal element back toward the primarily reflective (concave) side of the semi-reflective concave mirror. The images are then reflected by the semi-reflective concave mirror back toward the cholesteric liquid crystal element which transmits the images to the observer.

8 Claims, 2 Drawing Sheets

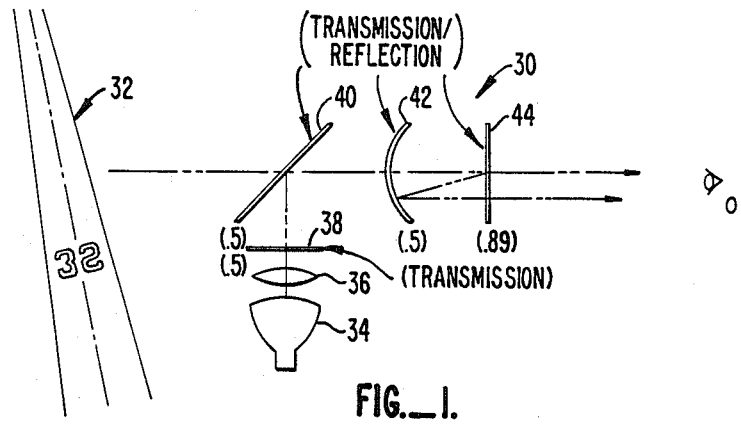
FIG._1.
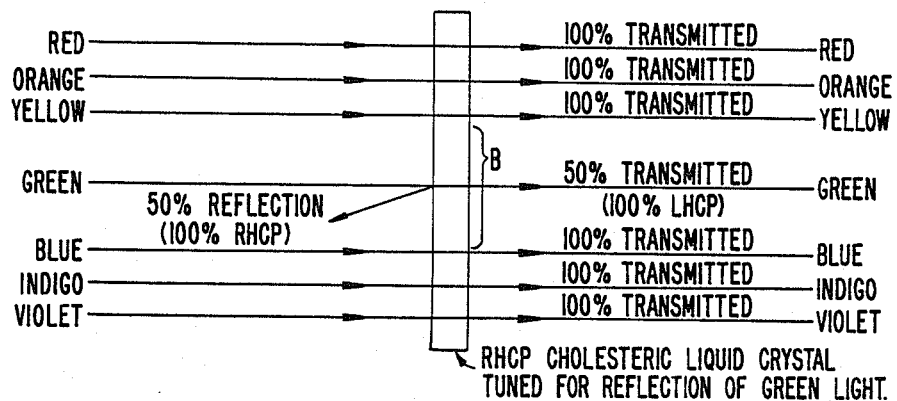
FIG._2a.
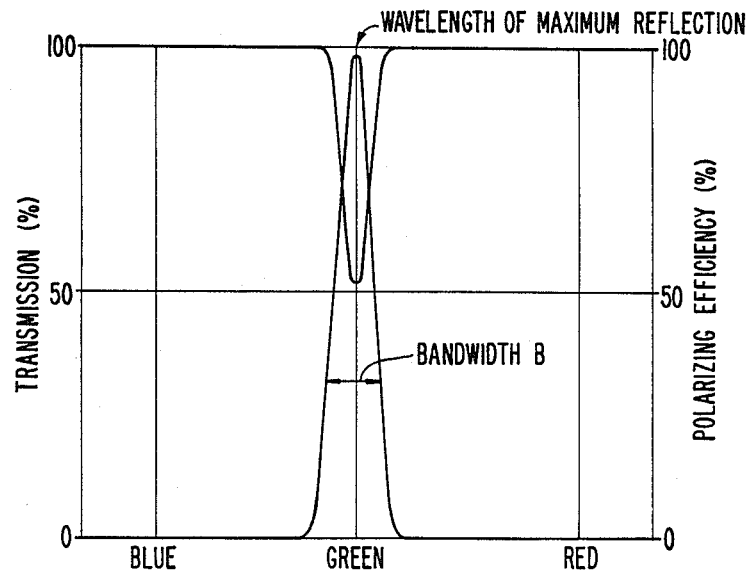
FIG._2b.

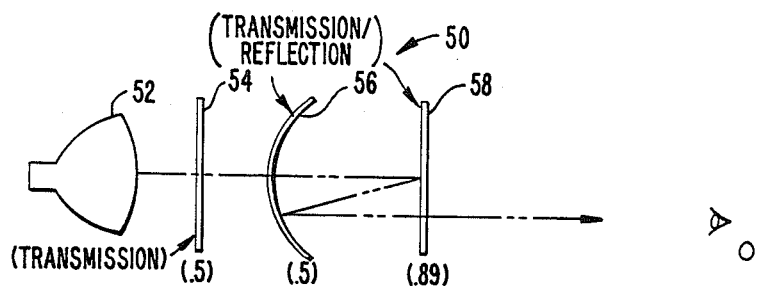
FIG._3.
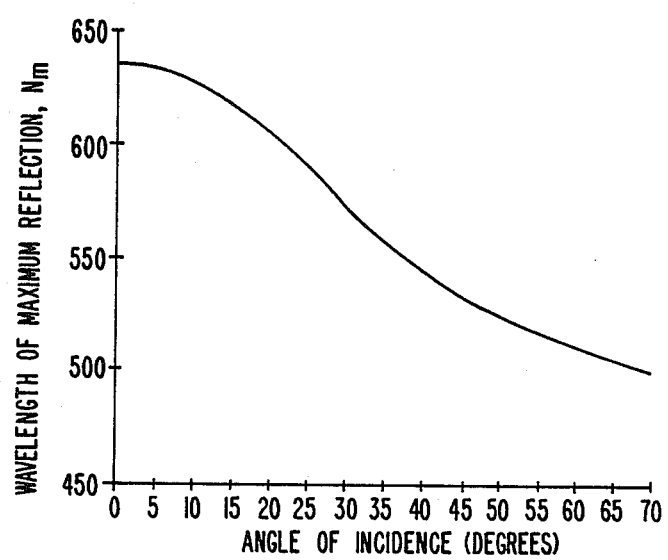
FIG._4.
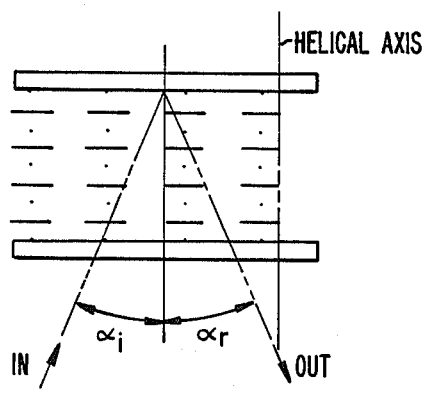
FIG._5a.
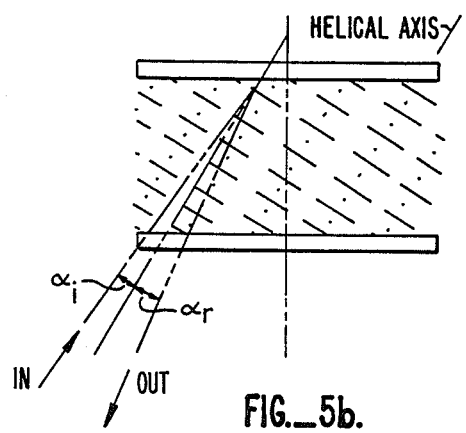
FIG._5b.

OPTICAL COLLIMATING APPARATUS

BACKGROUND OF THE INVENTION

1. Field of the Invention

The present invention relates generally to the field of visual display systems for use in aircraft, flight simulators, etc., and more particularly to an apparatus for collimating a projected image at or near infinity, having high transmission of images incident thereupon.

2. Description of the Prior Art

Optical collimation apparatus capable of forming an image at or near infinity of an object or a plurality of optically superimposed objects have been known for some time. One such apparatus is described in U.S. Pat. No. Re 27,356, reissued May 9, 1972. As disclosed, an apparatus having a single spherically curved combining mirror is used as an image forming element. A primary image is directed at the convex side of the mirror, which transmits the image to a birefringent beam splitter array, positioned on the concave side of the mirror. The Array reflects the image back to the spherical mirror, collimating the image for viewing by an observer. Several polarizing filters in the light path selectively direct that part of the primary image which returns to the spherical mirror.

The apparatus taught in Re No. 27,356 may be assembled in compact size and light weight. However, due to the required multiple filtering and reflections of the primary image, transmissivity of the primary image is low. For example, each filtering and reflection of the primary image successively reduces the image's intensity by approximately one-half. The result is an ultimate transmission in the neighborhood of 0.5 to 10 percent of the original intensity of the primary image.

Another system, described in U.S. Pat. No. 3,940,203, issued Feb. 24, 1976, is a variation on the previously discussed Pat. No. Re 27, 356 which replaces the spherical mirror with a reflection-type holographic analog of a spherical mirror. Because the disclosed apparatus must employ a relatively large number of reflections and transmissions to properly control light which reaches the observer, this technique also suffer from low transmission of the primary image. By utilizing the improved reflection and transmission characteristics of the holographic element, efficiency on the order of 6 to 10 percent of an image's original intensity is achieved at best.

Thus, there is a present need in the art for an optical collimation apparatus with improved transmisivity of images. Further, since application of such optical collimation apparatus may include helmet-mounted display systems or other applications where size and weight are critical, there is a present need for such an optical collimation apparatus which is both compact and lightweight.

SUMMARY OF THE INVENTION

The present invention is directed to an optical collimation apparatus that utilizes the properties of cholesteric liquid crystals to form, preferably at or near infinity, an image of an object or of a plurality of objects optically superimposed, in the line of sight of an observer.

According to a preferred embodiment of the present invention, the collimation apparatus is formed of a semi-reflective concave mirror and a cholesteric liquid crystal element. The semi-reflective concave mirror and cholesteric liquid crystal element are utilized together with a transmitter/combiner placed in the line of sight of an observer. An image source, such as a cathode ray tube (CRT), liquid crystal display (LCD), or other display device is provided such that images projected thereby are reflected by the transmitter/combiner into the line of sight of the observer.

The reflected image is passed through a circular polarizing filter to the semi-reflective concave mirror, circularly polarizing the image. The semi-reflective concave mirror transmits the image to the cholesteric liquid crystal element which is polarized in a rotary sense opposite that of the image, causing the image to be reflected without reversal of its rotary sense, back to the concave side of the semi-reflective concave mirror. The image is then reflected (and its rotary sense reversed) by the semi-reflective concave mirror back toward the cholesteric liquid crystal element, which now transmits the image or images to the observer.

An image from the outside environment is transmitted through the transmitter/combiner, through the semi-reflective concave mirror, and partially transmitted by the cholesteric liquid crystal element to the observer, and partially reflected by the cholesteric liquid crystal element back toward the concave side of the semi-reflective concave mirror. That portion of the image reflected by the cholesteric liquid crystal element is in turn reflected by the semi-reflective concave mirror back toward the cholesteric liquid crystal element, which transmits the image to the observer.

Transmission efficiency for this embodiment is increased over the prior art in that fewer reflections and transmissions of the image takes place and in that the cholesteric liquid crystal element transmits and/or reflects a higher percentage of the incident light than the reflective devices of the prior art.

The invention will now be further described with reference to the accompanying drawings.

BRIEF DESCRIPTION OF THE DRAWINGS

FIG. 1 illustrates an embodiment of an optical collimation system according to the present invention, in a heads-up display/image combiner application;

FIG. 2(a) illustrates the transmission characteristics of a cholesteric liquid crystal element reflective to RHCP green light;

FIG. 2(b) is a graphical representation of transmission and polarization efficiency of a cholesteric liquid crystal element;

FIG. 3 illustrates an alternate embodiment of an optical collimation system according to the present invention;

FIG. 4 is a graph illustrating the angular dependence of the wavelength of maximum reflection; and FIGS. 5(a) and 5(b) illustrate the biasing of the reflection angle from the cholesteric liquid crystal element through the use of surface tilt, untilted and tilted cases respectively.

DETAILED DESCRIPTION OF THE PREFERRED EMBODIMENT

With reference to FIG. 1, a preferred embodiment of an optical collimating apparatus according to the present invention is shown. In such an embodiment, optical collimating apparatus 30 is used in a heads-up display or image combining display mode. Optical collimating apparatus 30 consists of image generating source 34, focussing optics 36, circular polarizing filter 38, transmitter/combiner 40, semi-reflective concave mirror 42 formed so as to have a primarily transmissive coating on its convex side, and a primarily reflective coating on its concave side, and cholesteric liquid crystal element 44, formed to be reflective to RHCP images within a bandwidth B centered around a primary frequency f (as shown in FIGS. 2(a) and 2(b)). Returning to FIG. 1, positioned in the line of sight plane between an observer, designated by an eye labelled O, and external object 33, having an image 32 (for example, an aircraft runway as shown) is transmitter/combiner 40, semi-reflective concave mirror 42, and cholesteric liquid crystal element 44. Image generating source 34 is positioned so that images projected therefrom pass through focussing optics 36, circular polarizing filter 38, and are reflected into observer O's line of sight by transmitter/combiner 40.

In operation, image 32 is transmitted by transmitter/combiner 40 to semi-reflective concave mirror 42, which in turn transmits image 32 to cholesteric liquid crystal element 44. Cholesteric liquid crystal element 44 transmits image 32 to observer O, except for a reflected portion of image 32 which is of the rotary sense (assume RHCP for illustration) and within the bandwith B of reflection of cholesteric liquid crystal element 44. That portion of image 32 which is reflected, is reflected without reversal of its rotary sense, to the concave side of semi-reflective concave mirror 42. Semi-reflective concave mirror 42 reflects that portion of image 32 back to cholesteric liquid crystal element 44, reversing its rotary sense (i.e., RHCP to LHCP) in so doing, so that that portion of image 32 is, as well, transmitted by cholesteric liquid crystal element 44 to observer O.

A generated image from image generating source 34, having a wavelength w of approximately 540 Nm (i.e., green), is focussed by focussing optics 36 and imparted with a rotary sense corresponding to the rotary sense of transmission (i.e., LHCP pursuant to the above assumption) of cholesteric liquid crystal element 44 by circular polarizing filter 38. The generated image is reflected by transmitter/combiner 40 with a reversal of its rotary sense (i.e., LHCP to RHCP) toward the convex side of semi-reflective concave mirror 42 in the line of sight plane of observer O. Semi-reflective concave mirror 42 transmits the generated image to cholesteric liquid crystal element 44, which reflects the generated image, without reversal of the image's rotary sense, back toward the concave side of semi-reflective concave mirror 42. Semi-reflective concave mirror 42 reflects the generated image, with a reversal of its rotary sense (i.e., RHCP to LHCP), back toward cholesteric liquid crystal element 44, which transmits the image to observer O.

Due to the nature of the optical components used in such a collimating apparatus, 100 percent transmission and reflection of light incident thereon is not realized. An image generated by image source 34 imparted with a single rotary sense (i.e., LHCP) by circular polarizing filter 38 is reduced in intensity by approximately 50 percent due to the removal of that part of the image of opposite rotary sense (i.e., RHCP). An image reflected by transmitter/combiner 40 is reflected at approximately 50 percent of the intensity it had immediately prior to incidence upon transmitter/combiner 40. An image transmitted by semireflective concave mirror 42 is transmitted at approximately 50 percent of the intensity it had immediately prior to incidence upon semi-reflective concave mirror 42. Likewise semi-reflective concave mirror 42 is capable of reflecting an image at 50 percent of its incident intensity. An image reflected by cholesteric liquid crystal element 44 is reflected at about 89 percent the intensity it had immediately prior to incidence upon cholesteric liquid crystal element 44. Likewise, cholesteric liquid crystal element 44 transmits an image at approximately 89 percent of its incident intensity.

Since the numerical percentage dimmunition of an image's intensity between its source 34, or the outside environment (i.e., image 32) and observer O for optical collimating apparatus 30 is the product of the percentage transmission by each of the component elements, the numerical percentage of transmitted image is, approximately $$(50\%)(50\%)(89\%) = 22.25\%$$

for image 32, and for the images generated by image source 34, approximately $$(50\%)(50\%)(50\%)(89\%)(50\%)(89\%) \approx 4.95\%$$

Comparing this to prior art apparatus which transmit outside images at approximately 6.25 percent, and transmit generated images at approximately 0.78 percent, the benefits provided by the present invention are apparent. The improved transmission provided by the present invention means that image 32 will be seen by observer O with improved clarity and that for generated images, image source 34 need generate images at a lower power level to maintain similar visibility, or that generated with the same power the images generated by image source 34 will have improved intensity and brightness over the prior art.

In general, to those skilled in the art to which this invention relates, many changes in construction and widely differing embodiments and applications of the present invention will suggest themselves without departing from its spirit and scope. For example, the apparatus according to the present invention may be used to collimate an image generated by an image source for a flight simulator or similar device. As shown in FIG. 3, the apparatus 50 according to this alternate embodiment is comprised of an image source 52, circular polarizing filter 54, semi-reflective concave mirror 56, and cholesteric liquid crystal element 58. An image generated by image source 52 within the bandwidth B of reflection of cholesteric liquid crystal element 58 is imparted with a rotary sense corresponding to the rotary sense of reflection of cholesteric liquid crystal element 58. The image is transmitted through semireflective concave mirror 56 to cholesteric liquid crytal element 58, which reflects the images back to the concave side of semi-reflective concave mirror 56, which in turn reflects the image back to cholesteric liquid crystal element 58, which transmits the now collimated image to observer O. In this alternate embodiment there may or may not be a transmitter/combiner (not shown) depending on the arrangement of the apparatus.

Further, the composition of the cholesteric liquid crystal element may be such that it has a bandwidth of maximum reflection centered at a wavelength other than 540 Nm. Likewise the bandwidth of maximum reflection around the wavelength may be varied as a function of the cholesteric liquid crystal's composition.

Further, the physical arrangement of components of the invention may be varied with specific results. For example, relying on a property of cholesteric elements, as demonstrated in FIG. 4, that the wavelength of maximum reflection is angular sensitive (i.e., as the angle of incidence increases, the wavelength of maximum reflection is shifted toward the shorter wavelenths) the wavelength of maximum reflection of the cholesteric liquid crystal element for normally incident light may be increased to compensate for the shift toward the shorter wavelengths of reflection for non-normally incident light.

Another property of cholesteric elements, demonstrated in FIGS. 5(a) and 5(b), is that the separation between the angle of incidence $a_i$ and angle of reflection $a_r$ is a function of the orientation, or tilt, of the helical axis of the cholesteric layer. As the helical axis is tilted away from normal to the surface of the cholesteric liquid crystal element the separation becomes smaller. Thus, positioning of the reflected image in the line-of-sight of the observer may be controlled by the composition of the element (as opposed to positioning of the image source).

Thus the disclosures and descriptions herein are purely illustrative and are not intended to be in any sense limiting.

What is claimed is:

1. An optical collimating apparatus for focussing an image at or closer than at an infinite distance from an observer, comprising the elements of:
    a circular polarizing filter;
    a semi-reflective concave mirror; and
    a cholesteric liquid crystal element.

2. An optical collimating apparatus for focussing an image at or closer than at an infinite distance from an observer, wherein the image is substantially transmitted by a semi-reflective concave mirror and a first portion of said transmitted image is further transmitted unreflected to the observer by a cholesteric liquid crystal element and a second portion of said transmitted image is reflected by the cholesteric liquid crystal element to the concave mirror, which reflects the second portion of the transmitted image back to the cholesteric liquid crystal element, which transmits the second portion of the transmitted image to the observer, comprising the elements of:
    an image source;
    a circular polarizing filter;
    a semi-reflective concave mirror; and
    a cholesteric liquid crystal element.

3. The apparatus according to claim 2 further comprising:
    a transmitter/combiner for combining a first image generated by said image source with a second image in a line of sight plane of an observer prior to incidence upon said semi-reflective concave mirror.

4. An optical collimating apparatus for focussing an image at or closer than at an infinite distance from an observer, and further for combining the focussed image with an image external to the optical collimating apparatus, comprising the elements of:
    an image source;
    a circular polarizing filter;
    a transmitter/combiner;
    a semi-reflective concave mirror; and
    a cholesteric liquid crystal element.

5. An optical collimating apparatus for focussing an image at or closer than at an infinite distance from an observer, and further for combining the focussed image with an image external to the optical collimating apparatus, wherein projected images from an image source are reflected by a transmitter/combiner acting as a combiner to combine the projected images with the images in the line of sight of the observer and further wherein the projected images are reflected by a cholesteric liquid crystal element to the semi-reflective concave mirror, which reflects the images back to the cholesteric liquid crystal element, which substantially transmits the images to the observer, and further wherein external images are substantially transmitted by the semi-reflective concave mirror and further substantially transmitted to the observer by the cholesteric liquid crystal element, comprising the elements of:
    an image source;
    a circular polarizing filter;
    a transmitter/combiner;
    a semi-reflective concave mirror; and
    a cholesteric liquid crystal element.

6. The apparatus according to claim 5, wherein said image source comprises a monochrome cathode ray tube, focussing optics for focussing an image generated by said monochrome cathode ray tube, and a circular polarizing filter for imparting images generated by said monochrome cathode ray tube with a first rotary sense.

7. A method for optically collimating an image at or closer than at an infinite distance from an observer, comprising the steps of:
    causing to be incident upon a semi-reflective concave mirror a primary image, and substantially transmitting said primary image to a cholesteric liquid crystal element, substantially transmitting a first portion of said primary image to the observer, and reflecting a second portion of said primary image to said semi-reflective concave mirror, said semi-reflective concave mirror substantially reflecting said second portion of said primary image back to said cholesteric liquid crystal element, said cholesteric liquid crystal element transmitting said second portion of said primary image to said observer.

8. A method for optically collimating an image at or closer than at an infinite distance from an observer, and further for positioning said image in a line of sight plane of an observer, comprising the steps of:
    generating an image, projecting said generated image upon a transmitter/combiner located in a line of sight plane of the observer which acts as a combiner to combine said projected image with an image in said line of sight of the observer, transmitting said combination of said generated image and said image in said line of sight plane of the observer to a semi-reflective concave mirror, said semi-reflective concave mirror substantially transmitting said image combination to a cholesteric liquid crystal element, said cholesteric liquid crystal element substantially transmitting to the observer a first portion of said image combination comprising a first portion of said image in said line of sight plane of the observer, said cholesteric liquid crystal element substantially reflecting a second portion of said image combination comprising a second portion of said image in said line of sight plane of the observer together with said generated image, to said semi-reflective concave mirror, which substantially reflects said second portion of said image combination back to said cholesteric liquid crystal element, said cholesteric liquid crystal element substantially transmitting said second portion of said image combination to the observer.

* * * * *